(No Model.) 7 Sheets—Sheet 1.

A. P. BOARDMAN.
POLISHING MACHINE.

No. 551,752. Patented Dec. 24, 1895.

Fig. 1.

Witnesses:
Geo. W. Young
Chas. L. Goss

Inventor:
Anson P. Boardman
By Knopfler Hordensmith Bottum Kley
Attorneys.

(No Model.) 7 Sheets—Sheet 2.

A. P. BOARDMAN.
POLISHING MACHINE.

No. 551,752. Patented Dec. 24, 1895.

Fig. 2.

Witnesses.
Geo. W. Young.
Chas. L. Goss.

Inventor:
Anson P. Boardman
By Wetter, Vonders, Smith, Potter & Weber
Attorneys.

(No Model.) 7 Sheets—Sheet 7.

A. P. BOARDMAN.
POLISHING MACHINE.

No. 551,752. Patented Dec. 24, 1895.

UNITED STATES PATENT OFFICE.

ANSON P. BOARDMAN, OF WATERTOWN, WISCONSIN.

POLISHING-MACHINE.

SPECIFICATION forming part of Letters Patent No. 551,752, dated December 24, 1895.

Application filed May 11, 1894. Serial No. 510,828. (No model.)

*To all whom it may concern:*

Be it known that I, ANSON P. BOARDMAN, of Watertown, in the county of Jefferson and State of Wisconsin, have invented certain new and useful Improvements in Polishing-Machines; and I do hereby declare that the following is a full, clear, and exact description of the invention, which will enable others skilled in the art to which it pertains to make and use the same, reference being had to the accompanying drawings, and to the letters of reference marked thereon, which form a part of this specification.

My invention relates particularly to machines designed to sandpaper and polish plane surfaces; and it consists, essentially, in certain improvements in means for adjusting and imparting an endwise reciprocating movement to the polishing-cylinders, means for adjusting the feed-rollers, means for supporting, guiding, and adjusting the presser-plates, and means for stretching and securing sandpaper on the polishing-cylinders, as hereinafter particularly described, and pointed out in the claims.

In the accompanying drawings like letters designate the same parts in the several figures.

Figs. 7 to 11, inclusive, are detail views, on an enlarged scale, of the device for securing and holding the paper on the polishing-cylinders, Fig. 7 being a longitudinal section on the line 7 7, Fig. 8; Fig. 8, a longitudinal section on the line 8 8, Fig. 7, in a plane perpendicular to the plane of the section shown in Fig. 7; Fig. 9, a cross-section on the line 9 9, Fig. 7; Fig. 10, an end elevation as seen from the left with reference to Figs. 7 and 8, and Fig. 11 a like elevation of the adjacent portion of the bare cylinder.

A designates the frame, which is provided with a bed $a$, having transverse openings therein, through which the upper sides of the polishing-cylinders and of the lower feed-rollers project slightly.

Figure 1:
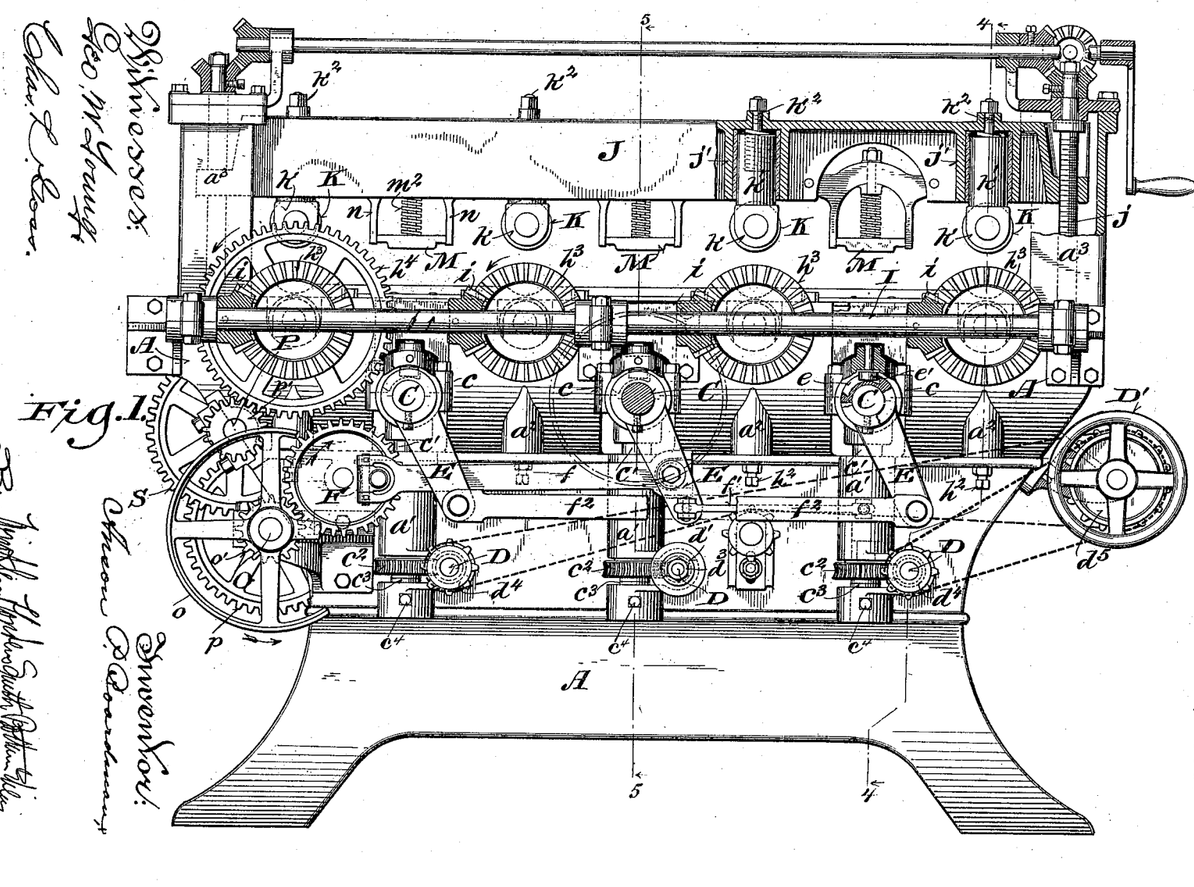
Figure 1 is a side elevation of my improved machine as seen from the left with reference to Figs. 4, 5, and 6.
Figure 2:
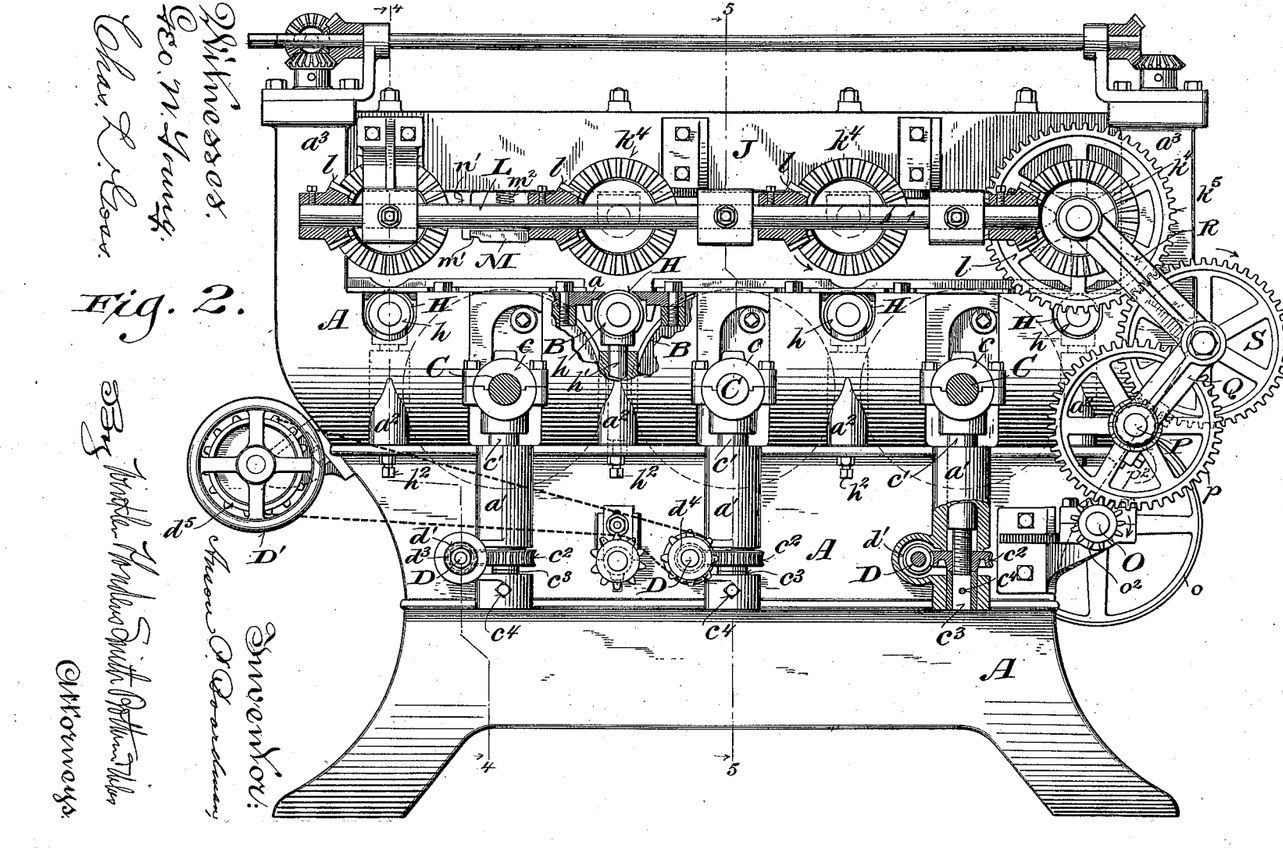
Fig. 2 is a side elevation as viewed from the right.
Figure 5:
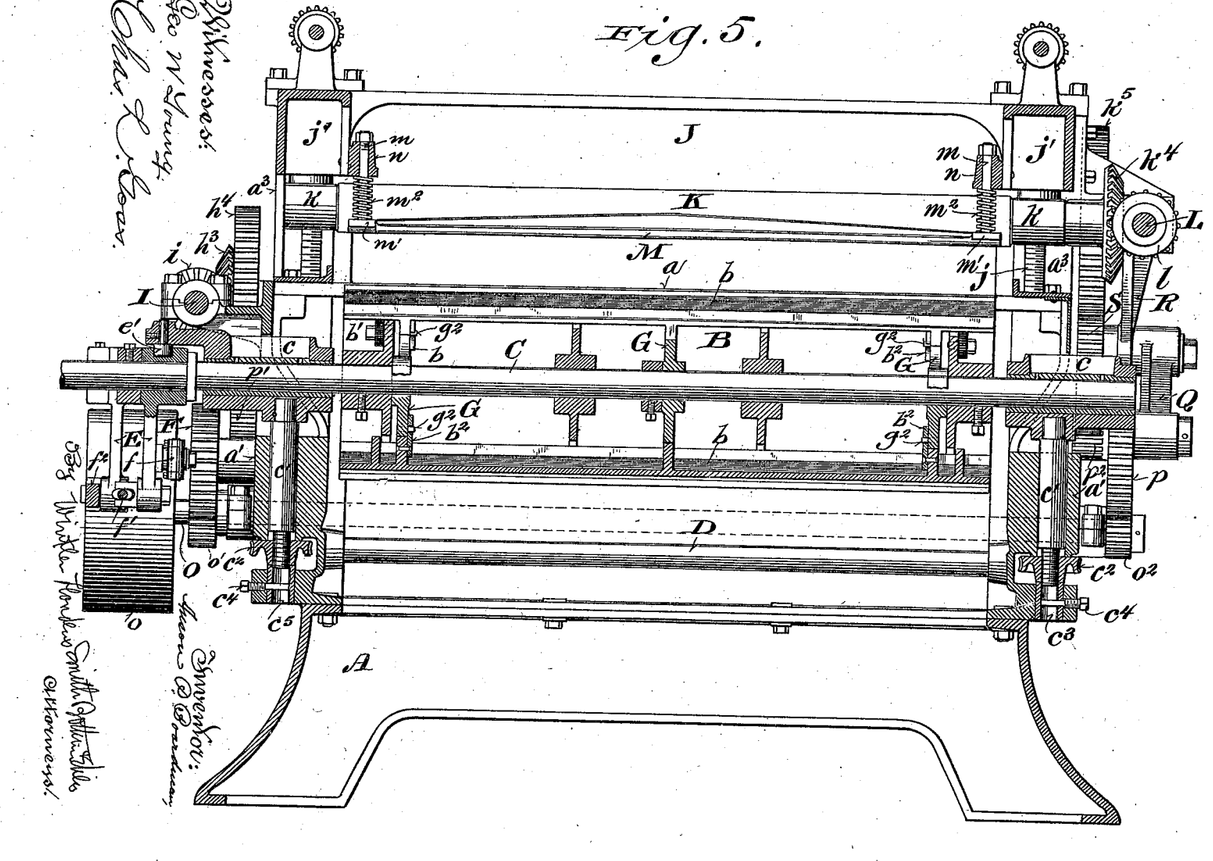
Fig. 5 is a similar section on the line 5 5, Figs. 1 and 2.

B B are the polishing-cylinders, three in number in the machine shown in the drawings, although their number may be varied according to the size of the machine and the kind and quality of work to be done. Each cylinder is mounted on a horizontal shaft C, which is supported at the ends in boxes $c\ c$, formed or provided on the under side with vertical stems $c'\ c'$, which are fitted and adjustably held in vertical sleeves $a'\ a'$ on the sides of the frame by nuts $c^2\ c^2$, threaded on their lower reduced ends and inserted in horizontal recesses in said sleeves, as shown in Figs. 1, 2, and 5. These nuts are formed with worm-gears and are supported on the under side by vertically-adjustable bushings $c^3\ c^3$, which are secured in the lower sections of the sleeves $a'\ a'$ by set-bolts $c^4\ c^4$.

Figure 3:
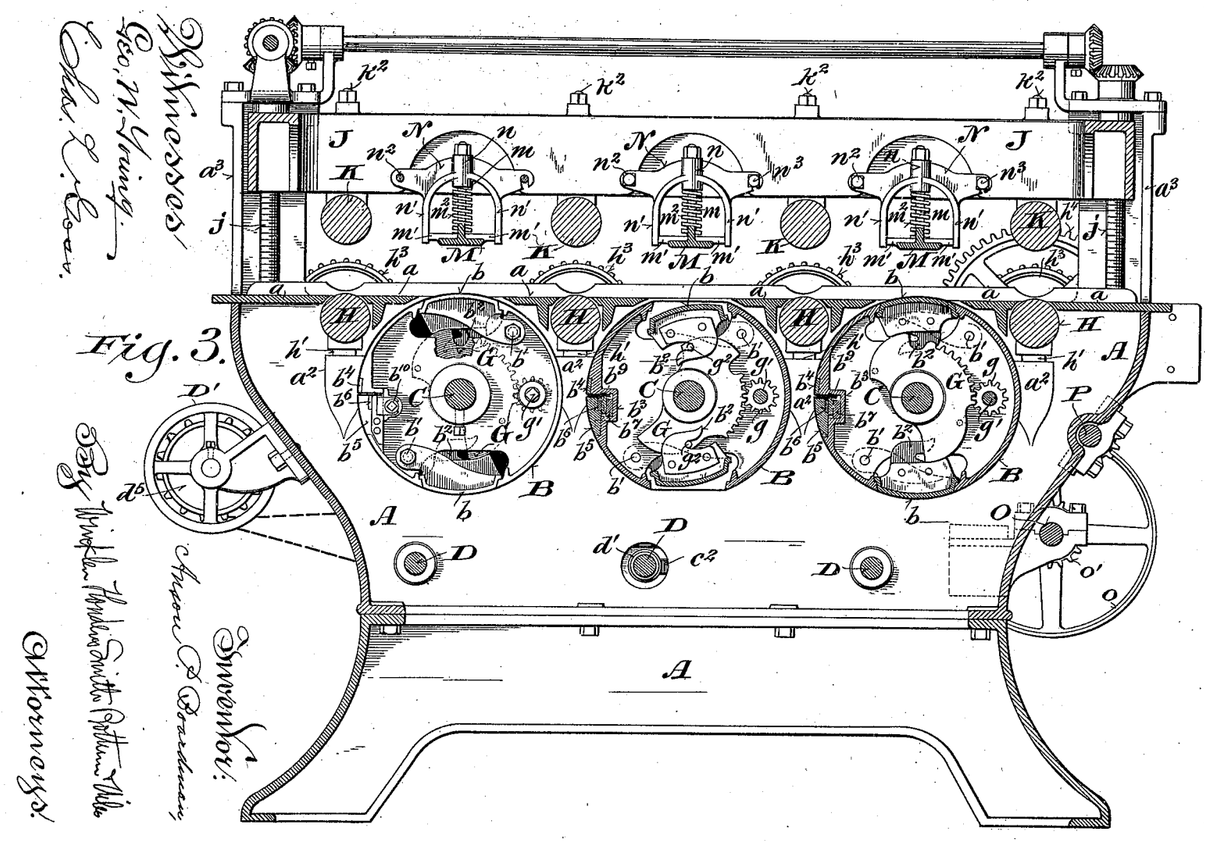
Fig. 3 is a vertical longitudinal section on the line 3 3, Fig. 6.
Figure 4:
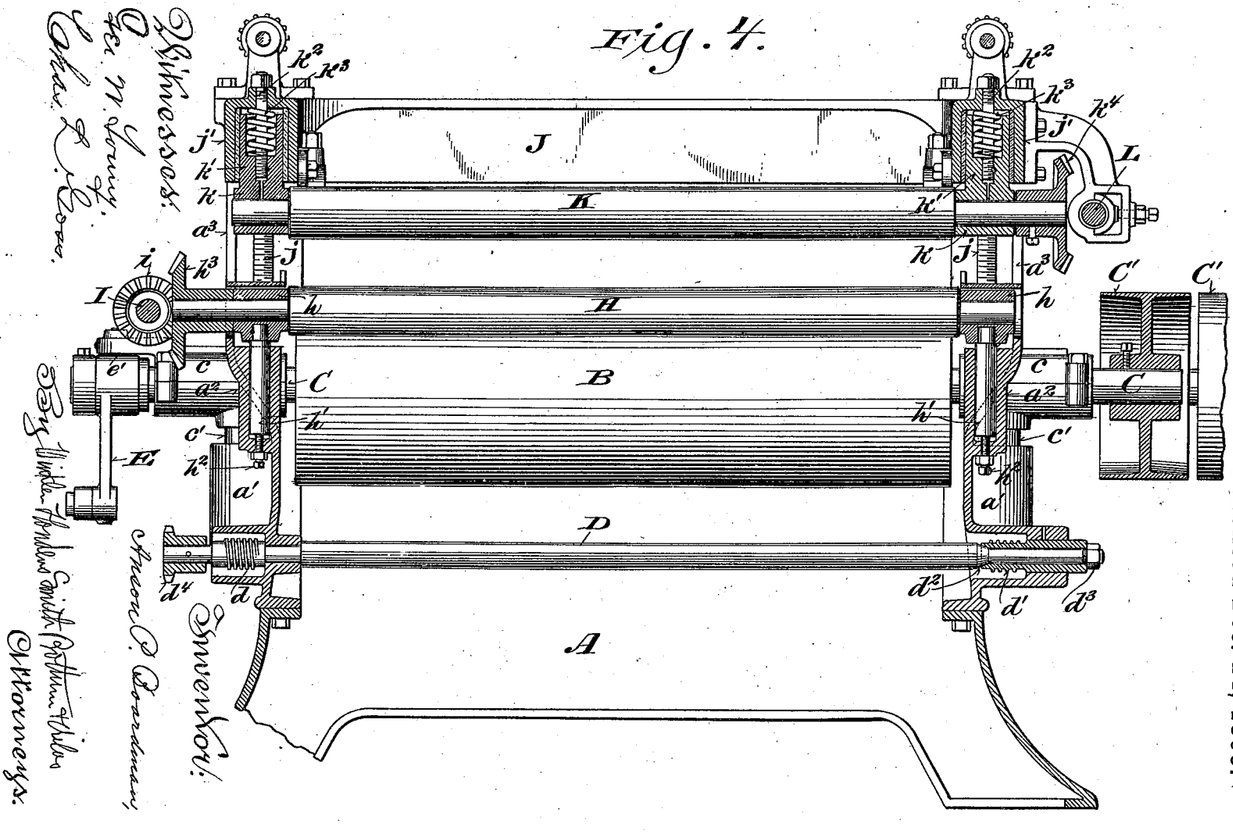
Fig. 4 is a vertical cross-section on the line 4 4, Figs. 1 and 2.

For each polishing-cylinder there is a cross-shaft D parallel therewith and provided at the ends with worms $d$ and $d'$ which engage with the worm-gears $c^2\ c^2$, as shown in Figs. 2 and 4. The worm $d'$ is fitted on the reduced end of the shaft D and is internally coned at its inner end to correspond with a conical shoulder $d^2$ on said shaft, these coned surfaces serving as a clutch for making said worm fast or loose on said shaft. It is also formed with a cylindrical portion which is fitted to turn in the supporting-bearing on that side of the machine. The projecting end of the shaft D is threaded and provided with a nut $d^3$, by tightening or loosening which said worm is made fast or loose upon said shaft. Each shaft D is provided at one end with a sprocket-wheel $d^4$, which is connected by a chain-belt with a sprocket-wheel $d^5$ on the shaft of a crank or hand wheel D' located at the front side of the machine within convenient reach of the operator, as shown in Figs. 1, 2 and 3.

By means of the connections just described the operator can, without leaving his station at the front side of the machine, raise and lower each of the several polishing-cylinders as desired. If one end only of either cylinder is to be raised or lowered for the purpose of leveling and adjusting it with reference to the bed $a$, the nut $d^3$ on the shaft D is loosened, and the proper hand-wheel D' is turned to raise or lower the opposite end of the cylinder as required. When this adjustment has been effected, the nut $d^3$ is tightened, so that both ends of the cylinder will be raised or lowered simultaneously and alike by turning the corresponding shaft D.

The worms $d$ and $d'$ are covered and protected by housings on the frame, opening into the horizontal recesses in the vertical sleeves $a'$, as shown in Figs. 2 and 4.

Figure 6:
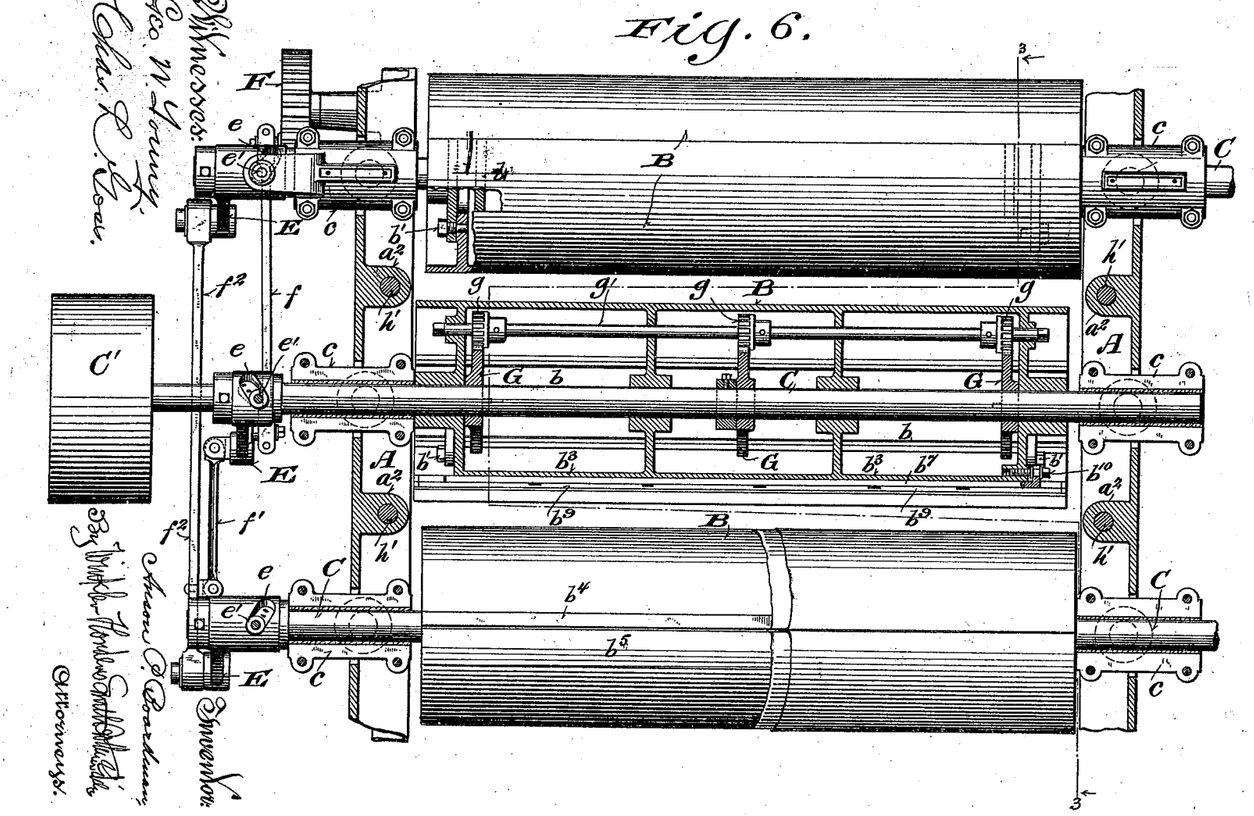
Fig. 6 is a partial plan view and horizontal section.
Figures 7, 8, 9, 10, 11:
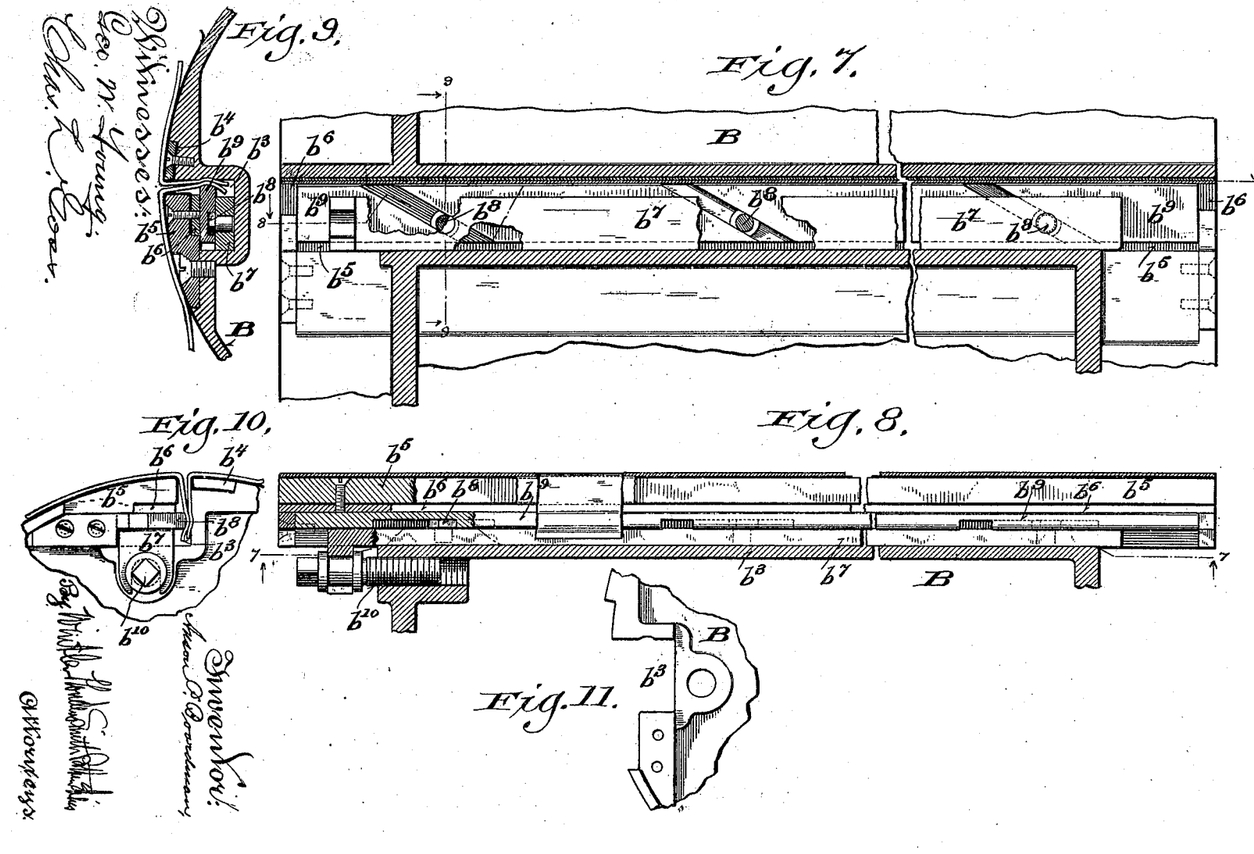

The cylinder-shafts C C are capable of a limited endwise movement in the boxes $c\ c$, as shown in Fig. 6, and are provided on one side of the machine with arms E E loosely mounted thereon, but restrained from endwise movement upon said shafts by collars or shoulders. The hubs of these arms are formed, as shown in Figs. 1, 5 and 6, with spiral or inclined slots $e\ e$, with which engage friction-rollers on pins $e'\ e'$, formed with or secured in overhanging projections of the adjacent boxes $c\ c$.

F is a gear-wheel provided with a crank-pin, which is connected by a pitman $f$ with the arm E of the middle cylinder. This arm is in turn connected by a short pitman $f'$ with a rod $f^2$ connecting the arms E E of the two outer cylinders, which each have the same reciprocating movement, while that of the middle cylinder alternates therewith. To provide for the movement in opposite directions of adjacent cylinders, the pitmen $f$ and $f'$ have universal or vertically-jointed connections with the members which they join. Obviously the rotation of the gear F will produce an endwise reciprocating movement of the several cylinders, that of the middle cylinder being in the opposite direction to that of the two outer cylinders. The sandpaper with which the cylinders are covered is thus caused to wear evenly, scratches are avoided in the work and a smoother and more even surface is produced. Each of the several cylinder-shafts is provided at one end with a pulley C', as shown in Figs. 4 and 6, and these pulleys are arranged on opposite sides of the machine in order to distribute more evenly the pull of the belts by which they are driven. Each cylinder is formed on opposite sides with longitudinal openings, in which are fitted inwardly-opening sections $b\ b$, as shown in Figs. 3, 5 and 6. These sections are hinged or pivoted at one side of said openings to the cylinder-heads at $b'\ b'$ and are formed on their longitudinal edges with flanges, which have corresponding seats in the cylinder at the edges of the openings therein. When closed outwardly against these seats, the sections $b\ b$ form continuous unbroken portions of the periphery of the cylinder.

G G are cams loosely mounted on the shaft C of each cylinder in position to engage with the inner sides of the sections $b\ b$ or projections thereon and when turned in one direction to swing said sections outwardly and to hold them closed rigidly against their seats. These cams are formed with segments of gears, which are engaged by pinions $g\ g$, fixed on the shaft $g'$, supported in the cylinder-heads parallel with the cylinder-shaft, and squared at its projecting ends to receive a wrench or key. The sections $b\ b$ are provided on the inside with inclines or hooks $b^2$, with which pins or projections $g^2\ g^2$ on the sides of the cams G are arranged to engage when said cams are turned in the proper direction to release and open said sections. By this means the hinged sections of the cylinders are positively held open until the cams are turned into the proper position to close them. The object of these hinged sections is to afford means of drawing the sandpaper smooth and taut over the surface of the cylinders about which it is wrapped, and they are made to open inwardly in order to avoid the tendency which I have found by experience centrifugal force has to move them outwardly beyond their proper positions, thus producing breaks in the surface of the cylinders and causing them to do imperfect work.

By the construction and arrangement of the inwardly-opening sections hereinbefore described I am enabled to provide seats therefor in the edges of the openings which they are designed to fill and to positively prevent their being forced or sprung by centrifugal action out of their proper working positions. The stretching of the sandpaper upon the cylinder is also facilitated and no perceptible break is made in the surface of the cylinder.

Referring to Figs. 7 to 11, inclusive, in connection with Figs. 3 and 6, the periphery of each cylinder is formed on one side, preferably opposite the shaft $g'$, with a longitudinal channel $b^3$ and with parallel recesses on opposite sides thereof. In these recesses are fitted clamping-plates $b^4$ and $b^5$, which are screwed or otherwise secured to the cylinder and serve to hold the edges of the felt or other soft elastic material with which the cylinder is covered before placing the sandpaper thereon. One edge of this sub-covering is clamped between the plate $b^5$ and a plate $b^6$, secured by screws or other means to its inner face. The larger clamping plate or strip $b^5$ overhangs and closes the channel $b^3$, except a narrow slot or opening of sufficient width to receive two thicknesses of sandpaper. In the bottom of channel $b^3$ is fitted a longitudinally-sliding bar $b^7$, which has pins or projections $b^8\ b^8$ on its outer face engaging with diagonal grooves in a laterally-movable clamping-bar $b^9$, fitted between it and the overhanging clamping-plates $b^5$ and $b^6$. The bar $b^7$ is moved lengthwise by means of a screw $b^{10}$, having a bearing in one end thereof and threaded in the cylinder-head. By this means the clamping-bar $b^9$ is moved laterally toward and from the opposing perpendicular or radial surface of the channel $b^3$, which constitutes one member of the clamping device, and the edges of the sandpaper inserted through the slot between the clamping plates or strips $b^4$ and $b^6$ are grasped and held between it and said surface.

It will thus be seen that by the foregoing construction and arrangement of the device for stretching the sandpaper and securing it to the cylinder the working surface of the cylinder is made continuous and unbroken, except by a single slot or opening of sufficient width for the insertion of the two edges of the sandpaper.

Referring to Figs. 1, 2, 3 and 4, H H designate the lower feed-rollers, which are supported between and parallel with the polishing-cylinders by vertically-adjustable boxes $h\ h$. These boxes are formed or provided, as shown most clearly in Fig. 4, with vertical stems $h'\ h'$ fitted in sockets $a^2\ a^2$ in the sides of frame A and engaged at their lower ends by screws $h^2\ h^2$, threaded in the lower ends of said sockets and serving to adjust said feed-rollers at each end vertically. Upon the projecting journals of said feed-rollers on one side of the machine are mounted bevel-gears $h^3\ h^3$. Upon a horizontal shaft I on the same side of the machine are mounted bevel-gears $i\ i$, which mesh with the gears $h^3\ h^3$. The feed-roller H at the rear end of the machine is provided with a spur-gear $h^4$, through which the shaft I and the other rollers H H are driven, as hereinafter explained.

J designates a vertically-adjustable frame carrying the upper feed-rollers and their connections. It is rigidly and adjustably supported at the corners upon vertical inter-geared screws $j\ j$, which have bearings in standards or posts $a^3\ a^3$ rising from the corners of the frame A. By means of these screws and their connecting gearing, like or similar to that usually employed for the purpose in this class of machines, said frame, together with the upper feed-rollers carried thereby, is raised and lowered bodily for stuff of different thicknesses or dimensions.

K K are the upper feed-rollers. They are supported at the ends in boxes $k\ k$, which are formed or provided with hollow or cup-shaped stems $k'\ k'$, fitted in inverted vertical sockets in said frame J. They are adjustably held therein by screw-threaded rods $k^2\ k^2$ passing upwardly through said frame and provided on the upper side thereof with nuts. $k^3\ k^3$ are spiral springs inserted in said hollow or cup-shaped stems around the rods $k^2\ k^2$ and bearing at their upper ends against the closed ends of the sockets $j'\ j'$. These springs allow the upper feed-rollers to yield upwardly at either end independently of each other. Any inequality in the thickness of the material upon which the machine operates is thus provided for, and at the same time the work is held snugly and firmly down against the lower feed-rollers and the polishing-cylinders. Upon the projecting ends of the upper feed-roller journals on one side of the machine are mounted bevel-gears $k^4\ k^4$, which mesh with similar gears $l\ l$, mounted upon a shaft L, which is carried lengthwise of the machine by brackets on the roller-frame J. The roller K at the rear end of the machine is provided with a spur-gear $k^5$, through which the shaft L and the other rollers K K are driven, as hereinafter explained.

M M are vertically-yielding presser bars or plates carried by the upper roller-frame directly over and parallel with the cylinders B B. They are formed or provided at the ends with vertical stems $m\ m$ and with laterally-projecting bearings $m'\ m'$, and are adjustably connected with said roller-frame by cross-heads or yokes N N, formed with vertical sleeves $n$, in which the stems $m\ m$ of the presser-bars are inserted and held, and with vertical guides $n'\ n'$, with which the laterally-projecting bearings $m'\ m''$ engage. These cross-heads are pivoted on one side of their sleeves $n$ to the roller-frame at $n^2$, and are detachably hooked on the opposite side over bolts $n^3$, by means of which the presser bars or plates may be adjusted in position by turning them on the pivots $n^2\ n^2$, or may be turned upwardly on said pivots, so as to afford unobstructed access to the exposed portions of the polishing-cylinders. Springs $m^2\ m^2$, placed on the stems $m\ m$ between the presser-bars and sleeves $n\ n$, allow each presser-bar to yield upwardly at either end and accommodate itself to variations in the thickness and inequalities of the stuff upon which the machine operates. They also serve to hold the work in place directly above and opposite the polishing-cylinders.

Referring to Figs. 1, 2, and 5, O designates the feed-roller and vibrator driving-shaft placed crosswise of the machine at its rear end. It is provided with a pulley $o$ for connecting it with a suitably-located counter-shaft and pinion $o'$, which meshes, as shown in Fig. 1, with the crank-gear F, which is connected with and actuates the vibratory arms E E, and a pinion $o^2$, which meshes, as shown in Figs. 2 and 5, with a gear $p$ on a parallel shaft P. This shaft P is provided on the opposite side of the machine, as shown in Fig. 1, with a pinion $p'$, which meshes with the gear $h^4$, and through it and the connections hereinbefore described, drives the lower rollers H H. On the opposite side of the machine said shaft P is provided with a pinion $p^2$, which meshes with an idle-gear S, carried by the pivot-pin connecting links Q and R, and meshing in turn with the gear $k^5$. The links Q and R are loosely connected at their other ends respectively with the shaft P and the journal of the gear $k^5$, through which and its connections hereinbefore described the upper feed-rollers K K are driven.

The link-and-gear connection just referred to permits of the vertical adjustment of the frame J without disturbing the driving connections of the upper feed-rollers K K carried by said frame.

I claim—

1. In a polishing machine, a sand-paper cylinder having an inwardly opening longitudinal section and longitudinal seats against which said section rests when closed outwardly flush with the periphery of the cylinder, substantially as and for the purposes set forth.

2. In a polishing machine a sand-paper cylinder having an inwardly opening longitudinal section hinged thereto on one side of the opening, and a seat on the opposite side of said opening, against which said section closes, substantially as and for the purposes set forth.

3. In a polishing machine a sand-paper cylinder having an inwardly opening longitudinal section, a cam and gear concentric with the cylinder, the cam being constructed and arranged when turned in one direction, to force said section outward and hold it closed against its seat, and a shaft parallel with the cylinder axis provided with a pinion meshing with said gear, substantially as and for the purposes set forth.

4. In a polishing machine, a sand-paper cylinder having inwardly opening longitudinal sections on opposite sides thereof and a cam concentric with the cylinder, constructed and arranged, when turned in one direction, to force said sections outwardly and hold them closed, and when turned in the other direction to draw them inwardly and hold them open, substantially as and for the purposes set forth.

5. In a polishing machine, a sand-paper cylinder having inwardly opening longitudinal sections provided on the inside with hooks or inclines, a cam revoluble on an axis concentric with the cylinder, constructed and arranged when turned in one direction to force said sections outwardly and hold them closed, and provided with projections arranged when they are turned in the opposite direction, to engage the hooks or inclines on said sections and draw them inwardly and hold them open, substantially as and for the purposes set forth.

6. In a polishing machine, a sand-paper cylinder having longitudinal openings in its shell or periphery on opposite sides thereof, inwardly opening sections hinged thereto on one side of said openings and provided with inwardly projecting inclined hooks, seats on the opposite side of said openings for said sections to close against, gears revoluble concentrically within said cylinder, and provided with lateral projections arranged when turned in one direction to engage said inclined hooks and open said sections, and a shaft parallel with the axis of the cylinder provided with pinions meshing with said gears, substantially as and for the purposes set forth.

7. In a polishing machine, a sand-paper cylinder having a longitudinal slot in its periphery and a radially arranged clamping surface on one side of said slot, longitudinal clamping plates let into recesses on opposite sides of and parallel with said slot, for holding the ends of the cylinder covering and a parallel clamping bar movable transversely to an intersecting radial plane of the cylinder toward and from said surface for holding both ends of the sand-paper together, substantially as and for the purposes set forth.

8. In a polishing machine, a sand-paper cylinder having a longitudinal channel formed therein with parallel recesses on opposite sides thereof in the periphery, clamping plates secured by screws in said recesses so as to leave a narrow slot between them, one overhanging and partially closing said channel and provided on the under side with a plate screwed thereto, a parallel laterally movable clamping bar inclosed within and working against one side of said channel which serves as a clamping or binding surface, a parallel longitudinally movable bar having projections engaging diagonal slots in said clamping bar, and an adjusting screw connecting said cylinder and longitudinally movable bar, substantially as and for the purposes set forth.

9. In a polishing machine, the combination of a sand-paper cylinder supported in boxes having vertical screw-threaded stems, guided in the frame of the machine, nuts engaging said stems and formed with worm gears restrained from vertical movement by bearings above and below them, a shaft parallel with the cylinder and provided with worms meshing with said gears, one of said worms having a clutch connection with said shaft, substantially as and for the purposes set forth.

10. In a polishing machine, the combination of a number of sand-paper cylinders supported in boxes having vertical screw-threaded stems guided in the frame of the machine, nuts engaging said stems and formed with worm gears having bearings in said frame, worm shafts provided with worms engaging with said gears, and hand wheels or cranks located at the front side of the machine all within reach of the operator and separately connected with said worm shafts by sprocket wheels and chain belts, substantially as and for the purposes set forth.

11. In a polishing machine, the combination of a sand-paper cylinder supported in boxes having vertical screw-threaded stems, vertical sleeves on the frame in which said stems are held and guided, nuts formed with worm gears mounted upon said stems and inserted in horizontal recesses in said sleeves bushings detachably and adjustably secured in the lower parts of said sleeves and constituting the lower bearings of said nuts and gears, and a cross shaft provided with worms engaging said gears, substantially as and for the purposes set forth.

12. In a polishing machine, the combination of a sand-paper cylinder supported in boxes having vertical screw-threaded stems guided in the frame, nuts mounted on said stems and formed with worm gears which have bearings in said frame, worms engaging said gears, one being formed with a conical friction surface, and a worm shaft on which said worms are mounted, provided at one end with a conical friction surface and a nut between which the coned worm is mounted, so as to be made fast or loose thereon by tightening or loosening said nut, substantially as and for the purposes set forth.

13. In a polishing machine, the combination of a sand-paper cylinder capable of endwise movement in its bearings, a crank arm having an oblique slot in its hub and loosely mounted on the cylinder shaft which is provided on both sides thereof with collars or shoulders to hold it in place, an overhanging projection from the adjacent bearing or frame provided with a pin or stud which engages said slot and a driving crank or eccentric connected with said arm, the connection between said arm and crank or eccentric having a joint whereby the lateral movement of said arm is permitted, substantially as and for the purposes set forth.

In testimony that I claim the foregoing as my own I affix my signature in presence of two witnesses.

ANSON P. BOARDMAN.

Witnesses:
CHAS. L. GOSS,
M. L. EMERY.